United States Patent
Choi

(10) Patent No.: US 7,181,145 B2
(45) Date of Patent: Feb. 20, 2007

(54) OPTICAL COMMUNICATION MULTIPLEX DEVICE FOR VEHICLE AND COMMUNICATION METHOD USING SAME

(75) Inventor: Byong-Sik Choi, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 580 days.

(21) Appl. No.: 10/749,231

(22) Filed: Dec. 30, 2003

(65) Prior Publication Data
US 2005/0078933 A1   Apr. 14, 2005

(30) Foreign Application Priority Data
Oct. 11, 2003   (KR) ...................... 10-2003-0070826

(51) Int. Cl.
*H04B 10/00*   (2006.01)
(52) U.S. Cl. .................... 398/164; 398/163; 398/149
(58) Field of Classification Search ............... 398/147, 398/149–150, 163–164
See application file for complete search history.

(56) References Cited
U.S. PATENT DOCUMENTS 5,469,199 A * 11/1995 Allen et al. .................... 347/42
5,541,524 A *  7/1996 Tuckerman et al. ........ 324/754
2002/0001776 A1 *  1/2002 Mori et al. .................. 430/302
2004/0087068 A1 *  5/2004 Yudasaka .................... 438/149

FOREIGN PATENT DOCUMENTS

| JP | 62-14549 | 1/1987 |
| JP | 8036195 | 2/1996 |
| JP | 8262504 | 10/1996 |
| JP | 2000241781 | 9/2000 |

* cited by examiner

Primary Examiner—Dzung Tran
(74) Attorney, Agent, or Firm—Morgan Lewis & Bockius LLP

(57) ABSTRACT

The optical communication multiplex device for a vehicle comprises optical communication lines connecting a transmitting terminal (Tx) to a receiving terminal (Rx). Contact resistances are disposed near the optical communication line to generate heat for changing the length of the optical communication lines. A power terminal and a ground terminal are respectively connected to one end and the other end of the contact resistances to thereby supply power to the contact resistances. A control terminal outputs a control signal for changing the length of the optical communication lines via the contact resistances supplied with power from the power terminal. A transistor connected between the control terminal and the contact resistances carries out a switching operation of power applied to the contact resistances from the power terminal in response to the control signal inputted from the control terminal.

4 Claims, 3 Drawing Sheets

OPTICAL COMMUNICATION MULTIPLEX DEVICE FOR VEHICLE AND COMMUNICATION METHOD USING SAME

CROSS-REFERENCE TO RELATED APPLICATIONS

This application claims priority of Korean Application No. 10-2003-0070826, filed on Oct. 11, 2003, the disclosure of which is incorporated fully herein by reference.

FIELD OF THE INVENTION

The present invention relates to an optical communication multiplex device for a vehicle and a communication method using same. More particularly, the invention relates to an optical communication multiplex device configured to simplify a physical network structure between vehicle communication loads, to reduce the size of the multiplex device, and to effectively form an electronic device system.

BACKGROUND OF THE INVENTION

As modern vehicles have diversified and become more sophisticated, data communications have increased between loads, such as electric and electronic equipments, mounted therein. Particularly, technology constituting a physical network using optical communication lines, such as optical fibers and the like, have been developed for carrying out a speedy and stable data communication, such that it is necessary to further simplify the physical network.

However, there is a drawback in that an increase of communication loads gives rise to structural complexity of multiplex devices, which in turn increases the physical size of multiplex devices in accordance with an increase of electronic equipment systems in need of control. This decreases the efficiency of the multiplex devices in optical communications.

SUMMARY OF THE INVENTION

The present invention provides an optical communication multiplex device for vehicle and a communication method using same configured to simplify a physical network between vehicle communication loads through a structure in which phase-varied signals can be received and transmitted via switching operation of transistors connected to control terminals. This reduces the size of the multiplex devices and effectively constitutes an electronic equipment system.

In accordance with a preferred embodiment of the present invention, the optical communication multiplex device for a vehicle comprises optical communication lines connecting a transmitting terminal (Tx) to a receiving terminal (Rx). Contact resistances are disposed near the optical communication line to generate heat for changing the length of the optical communication lines. A power terminal and a ground terminal are respectively connected to one end and the other end of the contact resistances to thereby supply power to the contact resistances. A control terminal outputs a control signal for changing the length of the optical communication lines via the contact resistances supplied with power from the power terminal. A transistor connected between the control terminal and the contact resistances carries out a switching operation of power applied to the contact resistances from the power terminal in response to the control signal inputted from the control terminal.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENT

The preferred embodiment of the present invention will now be described in detail with reference to the accompanying drawings, where the present embodiment should not limit the scope of the present invention and is desired only for illustrative purposes.

The present invention is an optical communication multiplex device for a vehicle configured to simplify a physical network structure between vehicle communication loads. The invention switches a transistor to reduce the size of the multiplex device, and to effectively form an electronic device system.

Figure 1:
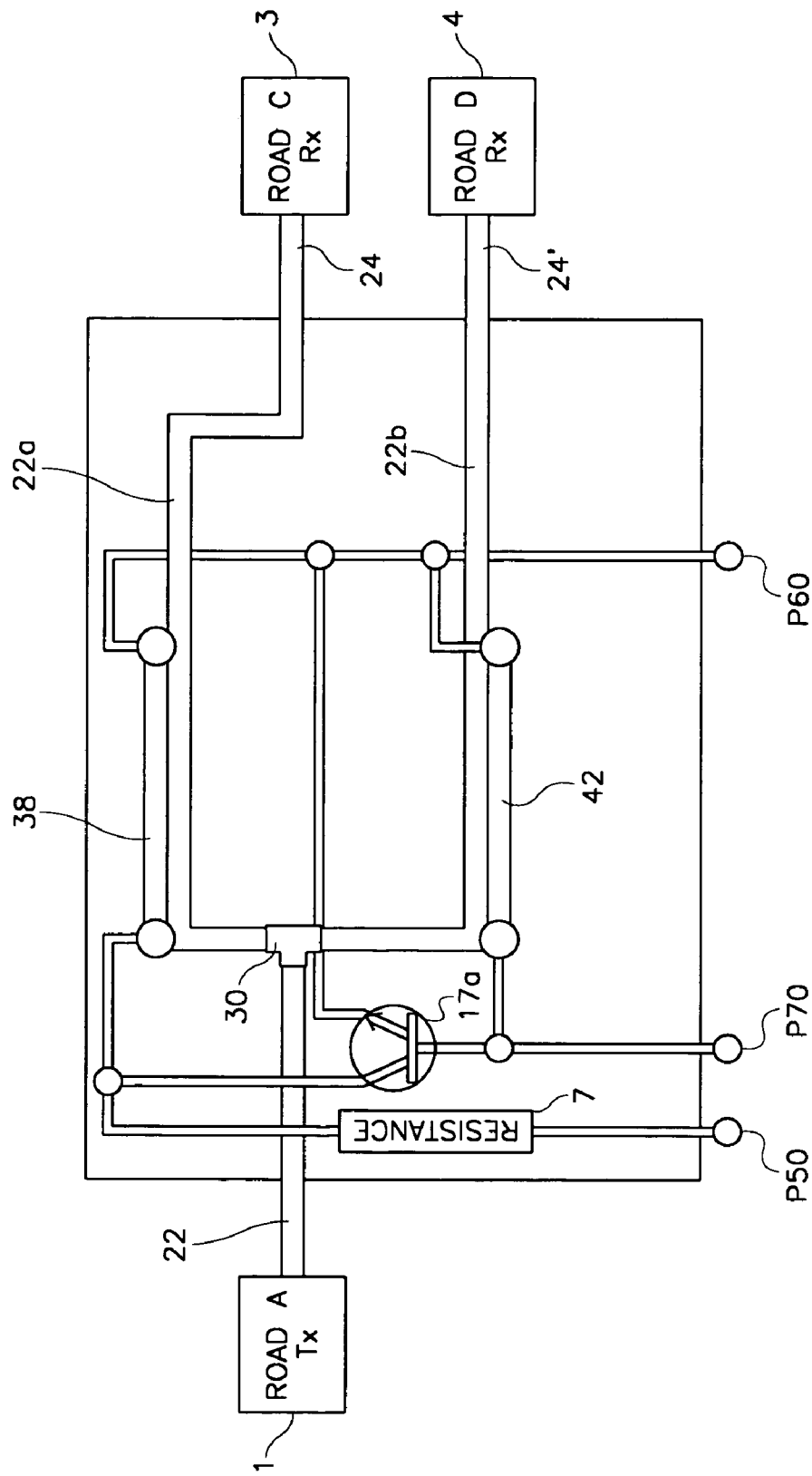
FIG. 1 is a schematic structural block diagram for illustrating a multiplex device according to an embodiment of the present invention.
Figure 2:
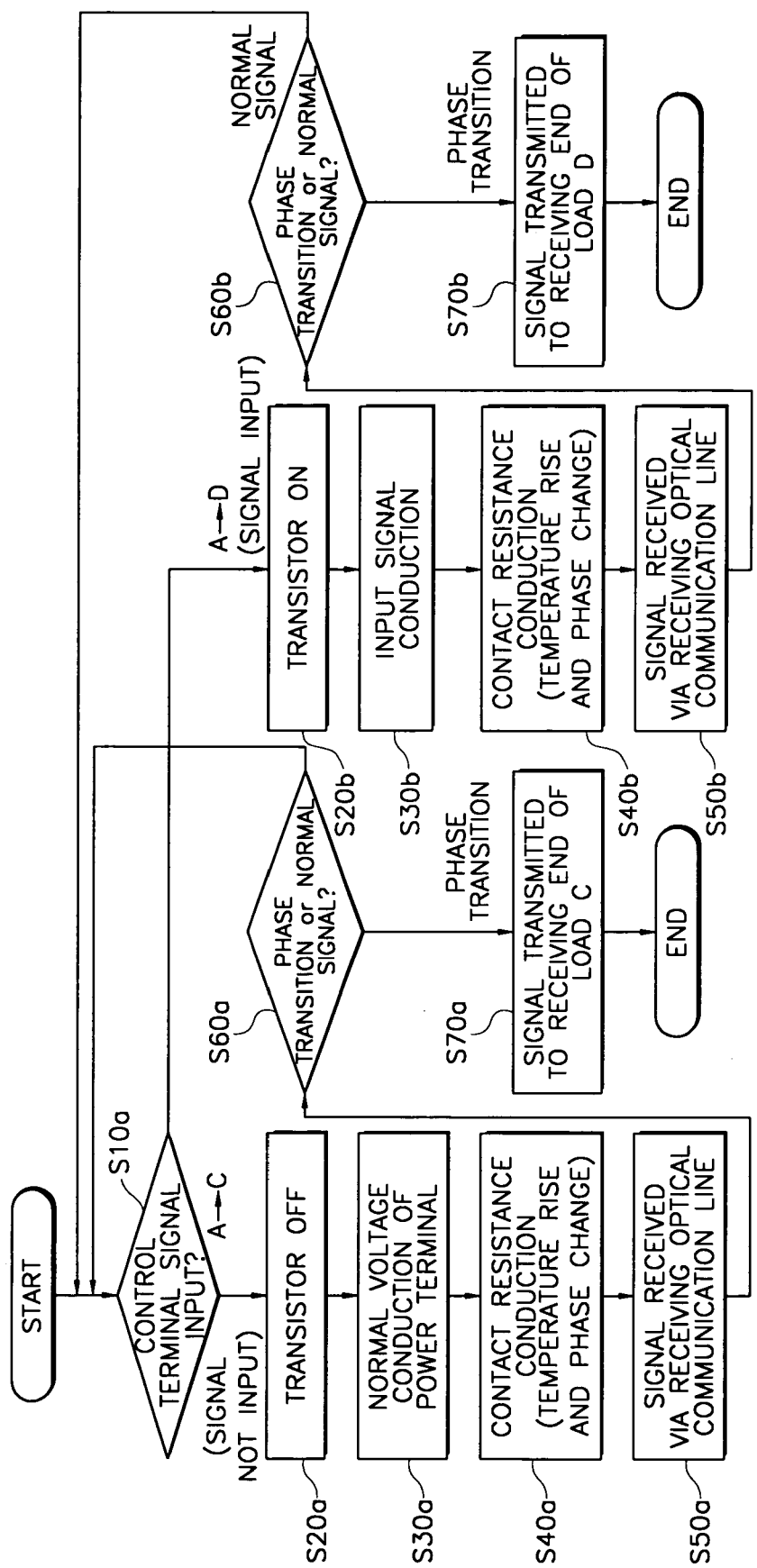
FIG. 2 is a flow chart of a communication method using a multiplex device according to an embodiment of the present invention.

As shown in FIGS. 1 and 2, the multiplex device according to the present invention comprises: optical communication lines 22a and 22b for connecting a transmitting terminal 1 (Tx) to receiving terminals 3 and 4 (Rx); contact resistances 38 and 42 disposed near the optical communication lines 22a and 22b to generate heat for changing the length of corresponding optical communication lines and for activating communication between the transmitting terminal and the receiving terminal; a power terminal (P50) and a ground terminal (P60) respectively connected to one end and the other end of the contact resistances 38 and 42 to thereby supply power to the contact resistances 38 and 42; a control terminal (P70) for outputting a control signal for changing the length of the optical communication lines via the contact resistances for activating communication between the transmitting terminal 1 and the receiving terminals 3 and 4; and a transistor 17a connected between the control terminal (P70) and the contact resistances 38 and 42 for carrying out a switching operation of power applied to the contact resistances 38 and 42 from the power terminal (P50) in response to the control signal inputted from the control terminal (P70).

The collector terminal (C) of the transistor 17a is connected to the power terminal (P50), an emitter terminal (E) is connected to a ground terminal (P60), a base terminal (B) is connected to the control terminal (P70), and a load resistance 7 is connected between the collector terminal (C) and the power terminal (P50).

In the multiplex device thus described according to the present invention, conduction is effected at corresponding contact resistances by switching operation of power applied from a power terminal in response to the presence or absence of a control signal from a control terminal inputted to a transistor in order to reduce the number of contacts in relation to the increase of communication loads.

A communication method using the multiplex device thus explained according to the present invention will now be described with reference to FIGS. 1 and 2, where S denotes a step. First, a discrimination is made as to whether a control signal is inputted from the control terminal (P70) (S10). As a result of the discrimination at S10, the transistor 17a is turned on or off (S20a or S20b). In other words, when a control signal is inputted from the control terminal to turn on the operation of the transistor, a transmission of signal from communication load (A) of the transmitting terminal 1 to communication load (D) of the receiving terminal 4 is effected. Meanwhile, when the transistor is turned off to stop operation, a transmission of signal is carried out from the communication load (A) of the transmitting terminal 1 to communication load (C) of the receiving terminal 3.

As mentioned above, when the transistor is ON (signal transmission from A to D), conduction is realized by the control signal (current) from the control terminal (S30b). In other words, the contact resistance 42 is conducted to lengthen the optical communication line 22b and to effect a phase change of the signal (S40b).

Meanwhile, when the transistor is OFF (signal transmission from A to C), conduction is effected by the voltage inputted from the power terminal (S30a). In other words, voltage is inputted from the power terminal, the contact resistance 38 is conducted to lengthen the optical communication line 22a and to effect a phase change of the signal (S40a). Meanwhile, through the conduction of the contact resistance at S40a or S40b, the signal transmitted from the optical communication line 22a or 22b is received by the communication load (C) or the communication load (D) via the receiving terminal 3 or 4 (S50a or S50b).

The flow now advances to S70a or S70b where a discrimination is made on the condition of the received signal (S60a or S60b) and only a phase-changed signal out of the received signals is received. At this time, the receiving terminals 3 and 4 of each communication load are disposed with a photodiode specifically arranged for detecting only the phase-changed signal.

Figure 3:
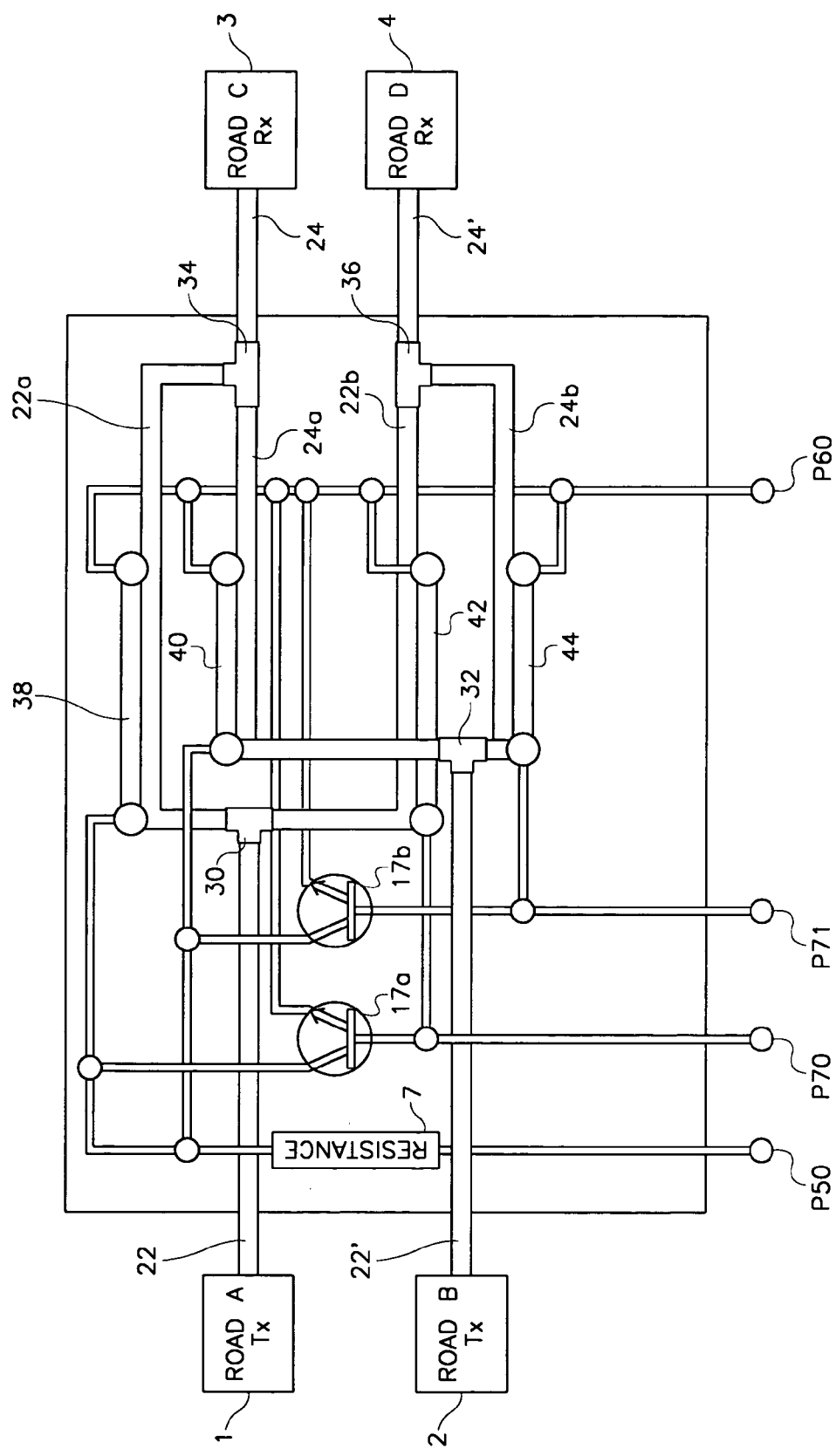
FIG. 3 is an expanded structural drawing of a multiplex device according to an embodiment of the present invention.

FIG. 3 illustrates a basic structure of a multiplex device shown in FIG. 1 but expanded by adding communication load of the transmitting terminal, and a basic concept thereof is the same as described in FIG. 1. A signal transmission from communication load (A) of the transmitting terminal 1 to communication load (C) of receiving terminal 3 or communication load (D) of receiving terminal 4 is switched by the transistor 17a for receiving the control signal from the control terminal (P70).

Meanwhile, a signal transmission from communication load (B) of transmitting terminal 2 to communication load (C) of receiving terminal 3 or communication load (D) of receiving terminal 4 is effected by the transistor 17b for receiving a control signal from a control terminal (P71). For example, when a control signal is inputted from the control terminal (P70) to the transistor 17a while a control signal from the control terminal (P71) is not inputted to a transistor 17b, a signal transmission from communication load (A) of transmitting terminal 1 and communication load (B) of the transmitting terminal 2 to communication load (C) of receiving terminal 3 and communication load (D) of receiving terminal 4 is effected.

In case of a signal transmission from the communication load (A) of transmitting terminal 1, the contact resistance 42 is conducted to enable receipt of the phase-changed signal by the communication load (D) of the receiving end 4 because the transistor 17a is turned on for operation. Meanwhile, in case of a signal transmission from the communication load (B) of the transmitting end 2, a contact resistance 40 is conducted to enable receipt of the phase-changed signal by the communication load (C) of the receiving terminal 3 because the transistor 17b is turned off.

In FIGS. 1 and 3, unexplained reference numerals 30 and 32 are distributors for connecting the optical communication lines so that signals transmitted via the optical communication lines can be transmitted on the same phase of signals. Reference numerals 34 and 36 are couplers for transmitting signals transmitted from the optical communication lines on the same phase.

The foregoing description of the preferred embodiment of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto, and their equivalents.

As apparent from the foregoing, there are advantages in the optical communication multiplex device for a vehicle and a communication method using same thus described according to the embodiment of the present invention in that optical communication networks can be simplified in structure thereof and freedom of design can be enhanced. Second, addition or modification of electronic equipment systems can be easily carried out and maintenance cost and the number of assembly procedures can be reduced. And finally, miniaturization is possible due to the reduced number of external terminals compared with that of the existing optical communication multiplex device.

What is claimed is:

1. An optical communication multiplex device for a vehicle comprising:

optical communication lines connecting a transmitting terminal (Tx) to a receiving terminal (Rx);

contact resistances disposed near said optical communication lines to generate heat for changing the length of said optical communication lines;

a power terminal and a ground terminal respectively connected to one end and the other end of said contact resistances to thereby supply power to said contact resistances;

a control terminal for outputting a control signal for changing the length of said optical communication lines via said contact resistances supplied with power from said power terminal; and a transistor connected between said control terminal and said contact resistances for carrying out a switching operation of power applied to said contact resistances from said power terminal in response to the control signal inputted from said control terminal.

2. The device as defined in claim 1, wherein a collector terminal of said transistor is connected to said power terminal, an emitter terminal is connected to a ground terminal, and a base terminal is connected to said control terminal.

3. The device as defined in claim 2, wherein a load resistance is connected between said collector terminal and said power terminal.

4. A communication method using an optical communication multiplex device for a vehicle, the method comprising the steps of:

turning on or off an operation of a transistor in response to a control signal from a control terminal;

carrying out a conduction of a corresponding contact resistance in response to the control signal from said control terminal when the transistor is operating, and carrying out a conduction of the corresponding contact resistance in response to a voltage inputted from a power terminal when the transistor is not operating;

receiving at a receiving terminal (Rx) a signal transmitted via an optical communication line adjacent to the conducted contact resistance; and receiving only the phase-changed signal at the receiving terminal (Rx).

\* \* \* \* \*